May 26, 1959 J. R. WILKERSON ET AL 2,888,670

AMBIGUITY ELIMINATOR

Filed Aug. 29, 1956 3 Sheets-Sheet 1

INVENTOR.
JEFFERSON R. WILKERSON
ROBERT D. TOLLEFSON
BY EUGENE G. FUBINI

H. H. Eaninger

ATTORNEYS

May 26, 1959 J. R. WILKERSON ET AL 2,888,670

AMBIGUITY ELIMINATOR

Filed Aug. 29, 1956 3 Sheets-Sheet 2

INVENTOR.
JEFFERSON R. WILKERSON
ROBERT D. TOLLEFSON
BY EUGENE G. FUBINI

H. A. Gearrigan
ATTORNEYS

May 26, 1959 J. R. WILKERSON ET AL 2,888,670

AMBIGUITY ELIMINATOR

Filed Aug. 29, 1956 3 Sheets-Sheet 3

INVENTOR.
JEFFERSON R. WILKERSON
ROBERT D. TOLLEFSON
EUGENE G. FUBINI

BY H. H. Brannigan

ATTORNEYS

United States Patent Office 2,888,670
Patented May 26, 1959

2,888,670

AMBIGUITY ELIMINATOR

Jefferson R. Wilkerson, Westbury, N.Y., Robert D. Tollefson, Cedar Rapids, Iowa, and Eugene G. Fubini, Glen Head, N.Y., assignors, by mesne assignments, to the United States of America as represented by the Secretary of the Navy Application August 29, 1956, Serial No. 606,942

4 Claims. (Cl. 340—345)

This invention relates to multi-channel receivers and means whereby a specific desired signal is produced regardless of the number of input signals obtained by the receivers. In essence, the present system eliminates any ambiguities which heretofore have been present in multichannel receivers.

The object of the present invention therefore is a coded system wherein with one signal received by the receiver, that signal, and no other, is transmitted to the output means.

A further object of this invention is a system which when a pair of signals are received, the system will always produce a consistent single output signal which can be predetermined.

A further object of the present invention is a system, which when a multiple set of signals are received, the system will always produce an output signal which will always be the same and bear a definite relationship to the incoming multiple signals.

Figures 1A, 3:
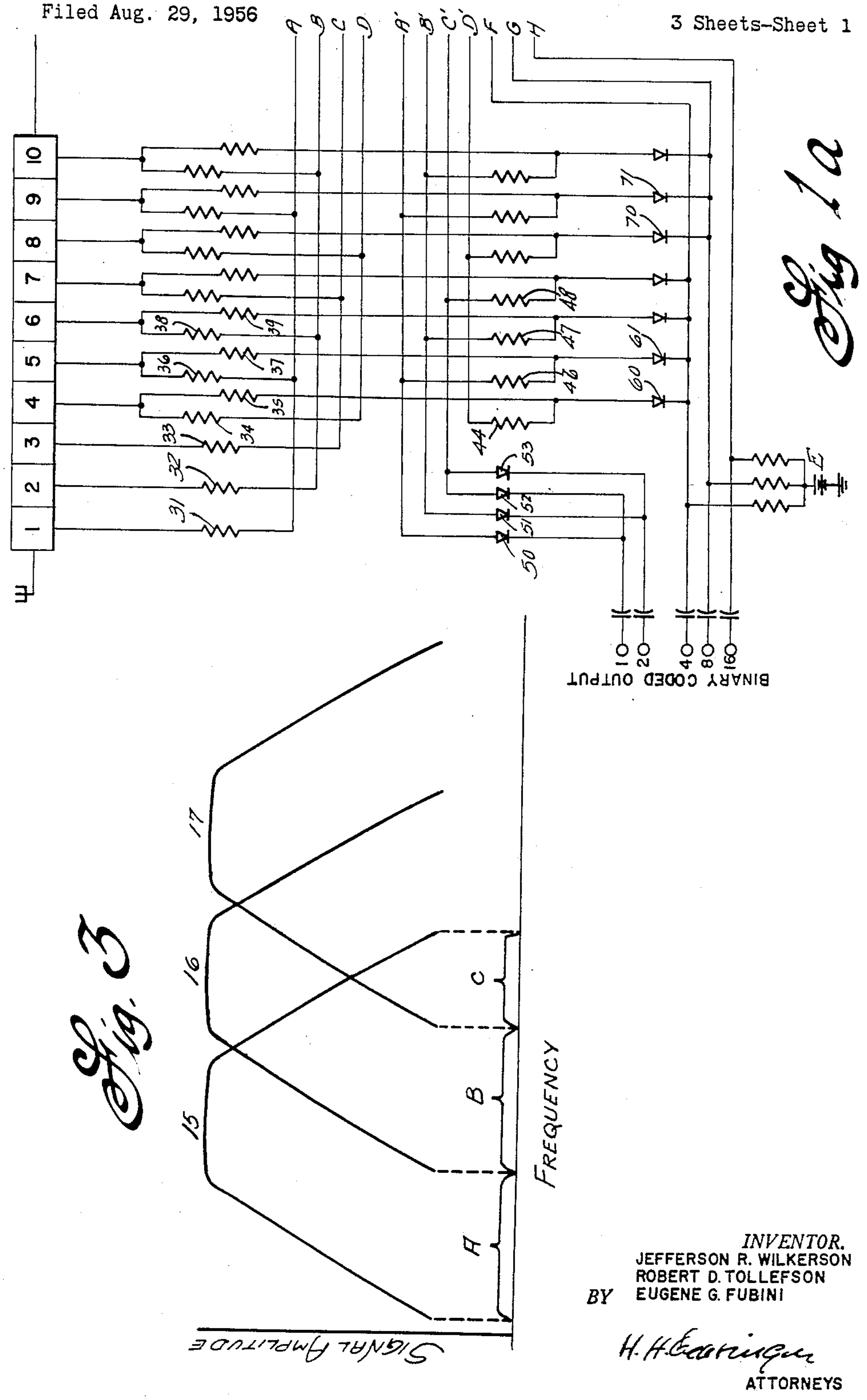
Figure 1B:
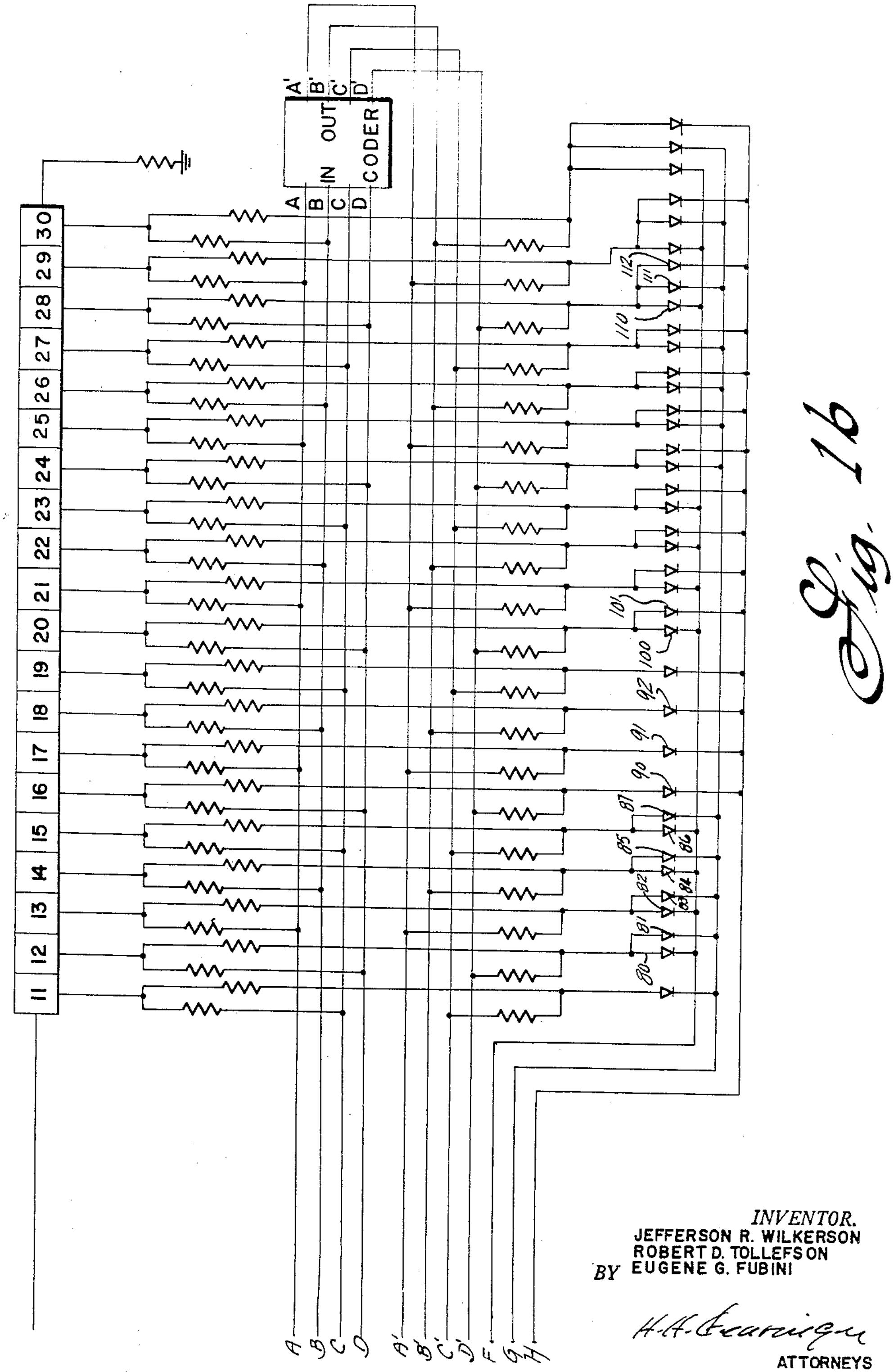
Figure 2:
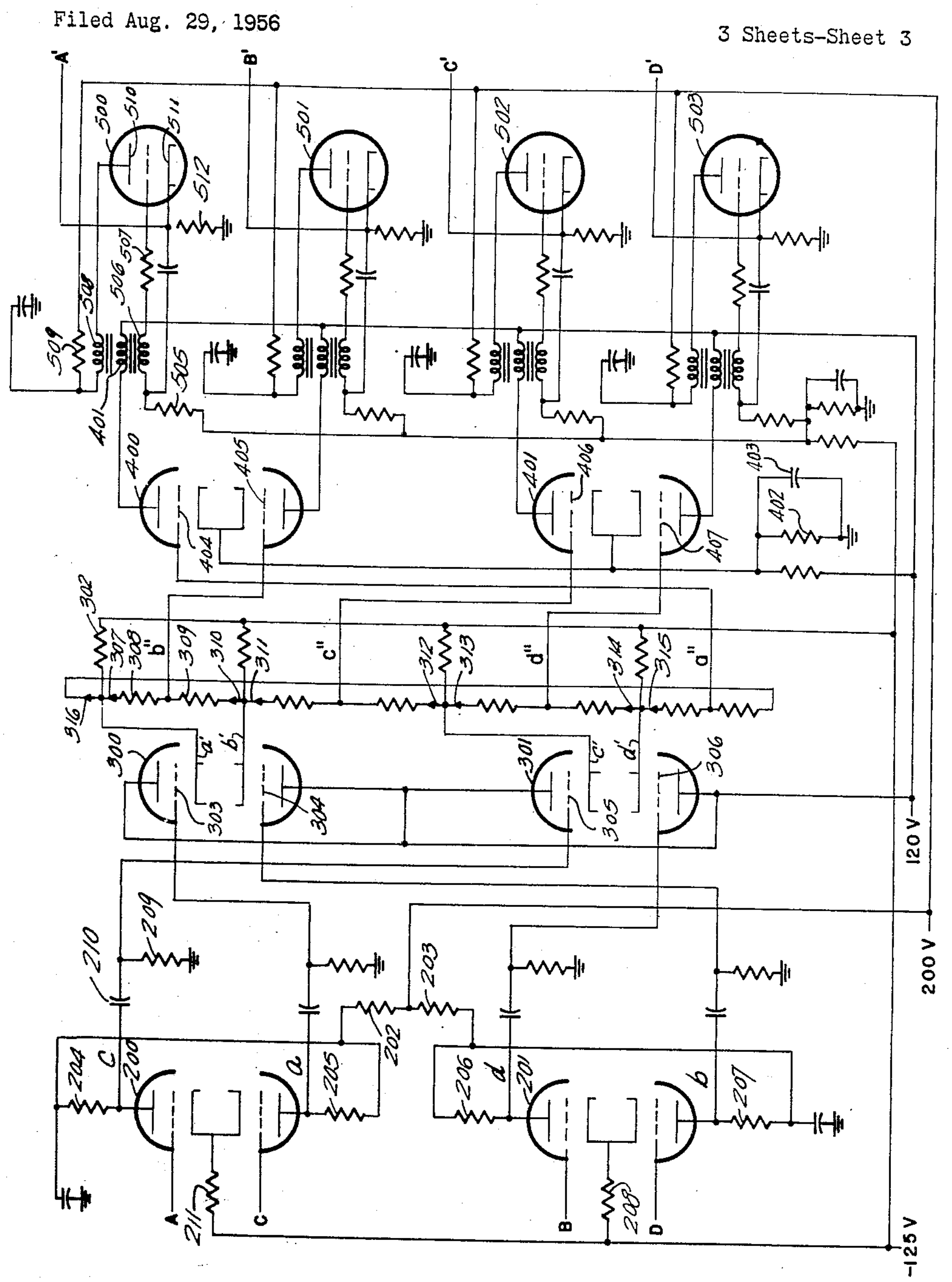

Other objects and advantages will be readily apparent to those skilled in the art from a reading of the following specification and an examination of the enclosed drawings wherein:

Figure 1 is a block diagram of the receivers, post-coding network and binary coding network, Figure 2 is a schematic diagram of the coder shown in Figure 1, and Figure 3 illustrates a graph of frequency vs. amplitude of the incoming signals.

The system of the instant invention uses the binary notation. The binary numerical system operates in the same way as the ordinary decimal system except the base is two rather than 10. To illustrate this, the number 14 in the decimal system means 1 times 10 (10′) plus 4×1 (10°) while in the binary system the number is written as 01110 meaning 0 times 16 ($2^4$) plus 1 times 8 ($2^3$) plus 1 times 4($2^2$) plus one times 2 (2′) plus zero times 1 (2°). The conversion table from the decimal system into the binary system is as follows:

*Table No. 1*

| Decimal Number | Binary Number | | | | |
|---|---|---|---|---|---|
| | 16 | 8 | 4 | 2 | 1 |
| 1 | 0 | 0 | 0 | 0 | 1 |
| 2 | 0 | 0 | 0 | 1 | 0 |
| 3 | 0 | 0 | 0 | 1 | 1 |
| 4 | 0 | 0 | 1 | 0 | 0 |
| 5 | 0 | 0 | 1 | 0 | 1 |
| 6 | 0 | 0 | 1 | 1 | 0 |
| 7 | 0 | 0 | 1 | 1 | 1 |
| 8 | 0 | 1 | 0 | 0 | 0 |
| 9 | 0 | 1 | 0 | 0 | 1 |
| 10 | 0 | 1 | 0 | 1 | 0 |
| 11 | 0 | 1 | 0 | 1 | 1 |
| 12 | 0 | 1 | 1 | 0 | 0 |
| 13 | 0 | 1 | 1 | 0 | 1 |
| 14 | 0 | 1 | 1 | 1 | 0 |

*Table No. 1*—Continued

| Decimal Number | Binary Number | | | | |
|---|---|---|---|---|---|
| | 16 | 8 | 4 | 2 | 1 |
| 15 | 0 | 1 | 1 | 1 | 1 |
| 16 | 1 | 0 | 0 | 0 | 0 |
| 17 | 1 | 0 | 0 | 0 | 1 |
| 18 | 1 | 0 | 0 | 1 | 0 |
| 19 | 1 | 0 | 0 | 1 | 1 |
| 20 | 1 | 0 | 1 | 0 | 0 |
| 21 | 1 | 0 | 1 | 0 | 1 |
| 22 | 1 | 0 | 1 | 1 | 0 |
| 23 | 1 | 0 | 1 | 1 | 1 |
| 24 | 1 | 1 | 0 | 0 | 0 |
| 25 | 1 | 1 | 0 | 0 | 1 |
| 26 | 1 | 1 | 0 | 1 | 0 |
| 27 | 1 | 1 | 0 | 1 | 1 |
| 28 | 1 | 1 | 1 | 0 | 0 |
| 29 | 1 | 1 | 1 | 0 | 1 |
| 30 | 1 | 1 | 1 | 1 | 0 |

The purpose of the instant invention is to have the network of Figure 1 generate a binary number indicating the receiver that received the incoming signal; thus the signal in receiver 14 should produce the binary number 01110 at the binary coded output.

The difficulty arises however, when due to the overlap of the pass bands of the filters in the receivers, two or more receivers respond to the same signal. As shown in Figure 3, a signal A would excite only the single receiver 15; a signal in B zone would be received by two receivers (15, 16); and a signal in zone C would excite receivers 15, 16 and 17. Thus, signals in the various zones would be recorded in an apparatus without the ambiguity eliminator as follows:

Zone A—15 ............................ 01111=15
Zone B—15 and 16 ..................... 11111=31
Zone C—15, 16 and 17 ................. 11111=31

It is evident that with multiple signals, errors are introduced; the solution is to have only one signal passed through the coder with multiple signals received and such signal must always bear a definite relation to the original multiple signals.

In Figure 1, the apparatus to perform this latter function consists of a plurality of receivers numbered 1 through 30. Each receiver includes a blocking oscillator in order that the receiver output pulses (or coder input pulses) all have nearly the same amplitude and duration, regardless of which receiver or receivers respond and regardless of signal strength. Each receiver has a threshold such that only signals, which exceed the threshold, trigger the blocking oscillator and thus produce an output pulse.

Receivers 1, 5, 9, 13, 17, 21, 25 and 29 are connected to bus A leading to the coder input and have resistors 31, 36 etc. in the connection; receivers 2, 6, 10, 14, 18, 22, 26 and 30 are connected to bus B leading to the coder input and also have resistors 32 etc. in the connection; receivers 3, 7, 11, 15, 19, 23 and 27 are connected to bus C and also have resistors 33 etc. in the connection; receivers 4, 8, 12, 16, 20, 24 and 28 are connected to bus D and also have resistors 34 etc. etc. in the connection.

Busses A′, B′, and C′ lead from the coder output to binary coded outputs 1 and 2; bus A′ to binary 1 through diode 50, bus B′ to binary 2 through diode 51 and bus C′ to binary outputs 1 and 2 through diodes 52 and 53.

The signals from receivers 4–30 are fed through resistors 35, 37, 39 etc. and continue to busses F, G, H. Receivers 4, 5, 6, 7 are connected to bus F; receivers 8–11 to bus G; receivers 12–15 to busses F and G; receivers 16–19 to bus H; receivers 20–23 to F and H; receivers 24–27 to busses G and H; receivers 28–30 to busses F, G and H. Each line connection to the busses F and/or G and/or H has a diode 60, 61 etc., 70, 71 etc., 80, 81 etc. therein; a single connection from the receiver to busses F, G or H having a single diode (60, 70, 90) while those receivers having connections to several busses have as many diodes as bus connections (80, 81 etc., 100, 101 etc., 110, 111, 112 etc.).

Each of the busses F, G or H is biased by a voltage E thus requiring each of the diodes to overcome this biasing voltage before conducting.

As evident in Figure 1, each of the busses F, G and H leads into binary coded outputs 4, 8 and 16 respectively.

Bus A′ is further connected to each of the leads leading from receivers 5, 9, 13, 17, 21, 25 and 29 through resistors 46 etc.; bus B′ is also further connected to each of the leads leading from receivers 6, 10, 14, 18, 22, 26 and 30 through resistors 47 etc. Thus each of the receivers (after No. 3) connected to bus A, B, C or D before the coder is also connected to A′, B′, C′ or D′ after the coder in the same order, i.e. A to A′, B to B′ etc.

The operation of the invention of Figure 1 will now be explained.

To obtain consistent results with multiple signals, some standard must be used as to which signal of the multiple signals is to be transmitted and which signals are to be suppressed. In the apparatus in use, with a pair of signals the signal from the receiver sensitive to the higher frequency range was transmitted while the lower was suppressed; with triple signals, the centre signal was transmitted and the outer two suppressed. The following table lists the standard used:

*Table No. 2—Coder logic*

| Coder Input | Coder Output |
|---|---|
| A | A′ |
| B | B′ |
| C | C′ |
| D | D′ |
| A and B | B′ |
| B and C | C′ |
| C and D | D′ |
| D and A | A′ |
| A, B and C | B′ |
| B, C and D | C′ |
| C, D and A | D′ |
| D, A and B | A′ |

It is of course understood that other choices may be utilized provided a consistent trend is followed in each grouping.

With a signal received by receiver 1 alone, it is transmitted to the coder on bus A; the coder feeds a signal on bus A′ causing diode 50 to conduct and producing a binary output 00001 (the operation and construction of the coder will be explained later).

Signals from receivers 2 or 3 operate in the same manner except of course that with receiver 3 diodes 52 and 53 conduct and thus producing for receiver 3 binary output 00011.

All subsequent signals, from 4 on, are interrelated with busses F, G and/or H, and an explanation for one suffices for all. Thus, if signal receiver 14 were actuated; the blocking oscillator produces an output pulse of 2E; the voltage divider adjacent the receiver would cause voltage E to be impressed upon bus B and a voltage E on each of the diodes 84, 85. Since busses F and G are biased by a counter voltage E, the diodes do not conduct at this time. The coder having an input at B produces an output at B′; this output actuates binary output 2 through diode 51. At the same time, an additional voltage is impressed upon diodes 84, 85 by the surge from bus B′ after passing through the resistor. This voltage actuates binary outputs 8, 4. The total of the three outputs is 01110 or 14.

In the case of two receivers responding, say 13 and 14, Table 2 (Coder Logic) shows that 14 (or B) must pass through while 13 (or A) must be suppressed. The signal from receiver 14 does pass through as just explained above. As will be explained in detail later, the coder produces no output on bus A′ consequently diode 50 is not conducting and no output appears on binary 1. A voltage of magnitude E appears on diodes 82, 83 from the receiver; however, since busses F and G are biased by a counter voltage E and no boosting voltage is passed to the diodes 82, 83 from bus A′, the diodes 82, 83 do not conduct. As a result only binary output 01110 or 14 is produced.

With three of the receivers responding, say 13, 14, 15, as in Zone C of Figure 3, the signal from receiver 13 is suppressed at the coder as explained above while the signal from receiver 14 is passed through. The signal from the receiver 15 is suppressed at the coder, i.e. no output appears on bus C′, thus diodes 52, 53, 86, 87 do not conduct. The binary output is 01110 or 14.

Any double or triple combination may be explained in a similar manner using the consistent coder logic of Table 2.

CODER

The function of the coder (Figure 2) is to produce pulses on busses A′, B′, C′ or D′ in response to pulses on busses A, B, C or D according to the coder logic of Table 2.

The circuit consists of a cathode coupled amplifier stage followed by a cathode follower stage which precedes a stage of amplification biased beyond cut-off which actuates in turn, a blocking oscillator. Each stage contains the necessary minor components necessary for the stage's completion but which really form no part of the present invention.

The circuit for the first stage, using conventional current flow, starts from the 200 v. bus, to the decoupling resistors 202, 203, through the load resistors 204–207, the plate, grid and cathode of each of the units in tubes 200, 201, then through the cathode resistors 208, 211 then return to the −125 v. bus. Each triode has connected to its grid the leads from buses A, B, C or D. A lead connects the plate of each triode to the grid of the succeeding stage; each lead contains a grid leak resistor 209, and a coupling capacitor 210.

The second or cathode follower stage starts from the 120 v. bus through the plate, grid, and cathode of each triode unit, through the load resistor 302, etc. and returns back to the −125 v. bus. The grid of the following amplifier stage branches off to the cathode side *a′*, *b′*, *c′* or *d′* via a resistor and a diode.

The second amplifier stage starts from the 120 v. bus through the transformer winding 401, the plate grid and cathode of each triode and returns to a bias voltage near ground potential which is provided for by the resistor 402 and capacitor 403.

The final stage starts from the 200 v. bus, through resistor 509, transformer winding 508, plate 510, cathode 511, resistor 512, and return to ground. The grid of each tube is connected to the transformer winding 506; the transformer winding 506, 508 are coupled to transformer winding 401, thus coupling the last amplifier stage with the blocking oscillator stage.

When no pulse is applied at A, B, C or D, the cathode coupled amplifiers (200, 201) are conducting, with both tubes of each amplifier conducting the same amount of current. If pulses are applied at A and C simultaneously, the current through both sections of tube 200 will increase and negative pulses will be generated at *a* and *c*. However, due to the large cathode resistor 211, the increase of current is quite small and the negative pulses are small.

On the other hand, if a pulse is applied at A only, the current increase through the upper half of the tube will tend to cause the common cathode terminal to go positive; with respect to the lower half of the tube, this is equivalent to making the grid more negative and the current through the lower tube decreases. Thus, the increase and decrease counterbalance each other and the current in the common cathode terminal changes only slightly. Cathode degeneration is not produced and the gain is relatively high.

The equations of the actual amplifier have been calculated as follows:

$$a=8.75(A-C)-0.25(A+C)$$

$$c=8.75(C-A)-0.25(C+A)$$

As is evident, the amplifier has relatively large gain (8.75) to the difference of the input voltages and very little to their sum.

As is further evident, the presence of both A and C produces, for all practical purposes, the same result as the absence of both A and C. Consequently, triple signals such as A, B and C produce the same result as B alone. The various combination of pulses generated at $a'$, $b'$, $c'$ and $d'$ from various combinations of pulses at A, B, C and D can be tabulated as follow:

*Table No. 3*

| Input On | Input Out | | | |
|---|---|---|---|---|
| | $a'$ | $b'$ | $c'$ | $d'$ |
| A | + | 0 | − | 0 |
| B | 0 | + | 0 | − |
| C | − | 0 | + | 0 |
| D | 0 | − | 0 | + |
| A and B | + | + | − | − |
| B and C | − | + | + | − |
| C and D | − | − | + | + |
| D and A | + | − | − | + |
| A, B and C | 0 | + | 0 | − |
| B, C and D | − | 0 | + | 0 |
| C, D and A | 0 | − | 0 | + |
| D, A and B | + | 0 | − | 0 |

It is evident from an examination of the above table that a triple response will have the same result as the single response. Input responses, such as the last four (4) in the table, have the same response as the signal of the middle input. With such output responses half the problem is solved.

Tracing the input responses from signals on A, B and C, zone C of Figure 3, it is seen that a positive pulse signal is at the grids of the two triodes in tube 200, while a positive pulse is at the grid of the upper triode in tube 201. As explained above, the lower unit of tube 201 conducts as if an equivalent negative pulse were on the grid of the lower triode. Because of the amplification factor, the result is to have a large negative pulse at $d$, a large positive pulse at $b$, and small negative pulses at both $a$ and $c$. Mathematically the inputs and outputs can be approximately as follows:

| Input | | Output | |
|---|---|---|---|
| A<br>+10 v.<br>B<br>+10 v. | C<br>+10 v.<br>D<br>0 | $a$<br>−5 v.<br>$b$<br>+85 v. | $c$<br>−5 v.<br>$d$<br>−90 v. |

With respect to the function and design of the coder, the −5 v. pulses can be treated as zero (0) pulses; the 85 v. and 90 v. pulses can be treated as pulses of equal magnitude.

Following lines $a$, $b$, $c$, and $d$ to the next stage, grids 303 and 305 have no pulse thereon, grid 304 has a positive pulse thereon, and grid 306 has a negative pulse thereon. Since this stage is a cathode follower, a positive pulse is produced at $b'$, a negative pulse at $d'$ and no pulses on $a'$ and $c'$.

Between $a'$ and $b'$, the positive pulse at $b'$ causes diodes 310 and 307 to conduct and current flows from $b'$ through diode 310, resistors 309 and 308 and diode 307 to $a'$. A positive pulse of one half the magnitude of the pulse at $b'$ is produced at $b''$; thus grid 405 also has a positive pulse thereon and the lower unit of tube 400 conducts triggering the blocking oscillator stage; tube 501 conducts and a pulse is sent via B′.

Between $a'$ and $d'$, diodes 315 and 316 conduct and current flows from $a'$ through diodes 315 and 316 and the associated resistors to $d'$ due to the negative pulse on $d'$; thus a negative pulse is produced at $a''$. Following this negative pulse to grid 404, a negative pulse merely increases the bias of this amplifier unit and the upper unit of tube 400 does not conduct.

The polarity of the voltages applied to diodes 311 and 314 is such that no current flows; thus no pulses are produced at $c''$ and $d''$.

Thus, the only output signal is at B′. Comparing this result with Table 2, it is seen that this is the result desired.

A single input signal, such as B, zone A of Figure 3, has the same output, B′, since small negative pulses at $a$ and $c$, in the case of the triple signal ABC just explained, were treated as no signal at all and of course with only a B signal, no pulse is created at $a$ or $c$.

A comparison of Table 2 with a pulse on B′ from a signal on B, shows that the resulting pulse ($b$) is the one desired.

Of course, any other triple or single signals or signal can be traced through the coder circuit in a similar manner.

There remains now only the case of a double signal, such as AB or BC, etc. (zone B of Figure 3). Referring to Table 2, the desired result is to have the signal from the receiver sensitive to the lower frequency range suppressed in the coder and the signal from the receiver sensitive to the higher frequency range passed through. For the sake of this example, assume that receivers 14 and 15 have responded producing signals or pulses on B bus and C bus.

Positive pulses at B and C will also have the effect on tubes 200 and 201 as if negative pulses were on the grids joined to buses A and D. In tabulated form, the output from tubes 200 and 201 will be as follows:

| Input | | Output | |
|---|---|---|---|
| A<br>0<br>B<br>+10 v. | C<br>+10 v.<br>D<br>0 | $a$<br>−90 v.<br>$b$<br>+85 v. | $c$<br>+85 v.<br>$d$<br>−90 v. |

As mentioned before, the 85 v. and 90 v. values will be treated as being of the same value. Thus, because of the phase reversal in amplifiers 200 and 201, equal positive pulses are on $b$ and $c$ and negative pulses of the same numerical value are on $a$ and $d$. Because of this, grids 304 and 305 have positive pulses thereon and grids 303 and 306 have negative pulses thereon. The units of the tubes conduct in such a manner that $b'$ and $c'$ have positive pulses and $a'$ and $d'$ have negative pulses.

Between $a'$ and $d'$, the plate of diode 316 is made more negative from the negative pulse on $a'$ therefore it does not conduct; while the cathode of diode 315 is made more negative by the negative pulse at $d'$ and it conducts producing a negative pulse at $a'$. The $a'$ negative pulse is placed upon grid 404 making the grid more negative; since the units of tubes 400 and 401 are biased beyond cut-off, the upper unit of the tube 400 does not conduct and no pulse is on output A′.

Between $c'$ and $d'$, the negative pulse on $d'$ makes the plate of diode 314 more negative therefore the diode 314 does not conduct; the positive pulse on $c'$ makes the cathode of diode 313 more positive, therefore this diode does not conduct. Since diodes 313, 314 do not conduct, $d''$ has no pulse, grid 407 has no pulse, the lower unit of tube 401 does not conduct and no pulse is on D′.

Between $b'$ and $c'$, the positive pulse on $b'$ makes the cathode of diode 311 more positive, therefore diode 311 does not conduct; the positive pulse on $c'$ makes the plate more positive on diode 312; the diode conducts and a positive pulse is received on $c''$. Following the $c''$ line, it is seen that a positive pulse is on grid 406. This positive pulse is sufficient to cause the upper unit of tube 401 to conduct; the associated blocking oscillator is triggered with tube 502 conducting and a positive pulse is received by C′.

Between $a'$ and $b'$, the negative pulse on $a'$ makes the cathode of diode 307 more negative; the diode conducts and a negative pulse is passed along resistor 308. On the other hand, the positive pulse on $b'$ makes the plate of diode 310 more positive; the diode conducts and a positive pulse is passed along resistor 309. The negative pulse and the positive pulse of equal magnitude produce an average pulse of zero (0) and no signal is received on $b''$; therefore, no signal is passed to grid 405; the upper unit of tube 400 does not conduct and therefore no signal output appears at A′.

It is thus seen that with a BC signal, the only signal passed through is the C signal with the B pulse being suppressed in the coder. A comparison of Table 2 shows that this is the proper signal that should be transmitted and the proper signal suppressed.

Any other combination of two signals can be worked out in a similar manner.

Obviously many modifications and variations of the present invention are possible in the light of the above teachings. It is therefore to be understood that within the scope of the appended claims the invention may be practiced otherwise than as specifically described.

What is claimed is:

1. In a network having four input circuits and four output circuits means for selecting a predetermined output circuit when two or three of said input circuits are simultaneously energized said selection means comprising a pair of dual triode electron tubes; a common cathode circuit for each dual triode including cathode resistor for inducing a cathode degeneration; an individual plate circuit including a load resistor for each triode; four cathode follower circuits, each having a plate, a cathode and a control grid; means responsive to changes in potential across each load resistor for energizing the control grid of an individual cathode follower circuit; means coupling the cathodes of the four cathode follower circuits to predetermined points in a series circuit such that the potential between a pair of adjacent points in the series circuit, which experience a substantial increase in potential, also increases substantially; and means coupling each output circuit of the network to the series circuit between individual adjacent pairs of points therein.

2. In a network having four input circuits and four output circuits means for selecting a predetermined output circuit when two or three of said input circuits are simultaneously energized said selection means comprising a pair of dual triode electron tubes; a common cathode circuit for each dual triode including cathode resistor for inducing cathode degeneration; an individual plate circuit including a load resistor for each triode; four cathode follower circuits, each having a plate, a cathode and a control grid; means responsive to changes in potential across load resistor for energizing the control grid of an individual cathode follower circuit; four pairs of resistors and four pairs of unidirectional current elements; a circuit including in series alternate pairs of the resistors and unidirectional elements, the said unidirectional elements all being oriented so as to allow current to flow in the series circuit only in a predetermined direction; means coupling the cathode of each cathode follower circuit to an individual junction of a pair of unidirectional elements in the series circuit; and means coupling each of the output circuits of the network to an individual junction of a pair of resistors in the series circuit.

3. In binary coding apparatus a plurality of receivers each sensitive to signals of a predetermined individual frequency range; a signal selection network having four input circuits and four output circuits, said signal selection network having a pair of dual triode electron tubes; a common cathode circuit for each dual triode including cathode resistor for inducing cathode degeneration; an individual plate circuit including a load resistor for each triode; four cathode follower circuits, each having a plate, a cathode and a control grid; means responsive to changes in potential across each load resistor for energizing the control grid of an individual cathode follower circuit; means coupling the cathodes of the four cathode follower circuits to predetermined points in a series circuit such that the potential between a pair of adjacent points in the series circuit, which experience a substantial increase in potential, also increases substantially; and means coupling each output circuit of the network to the series circuit between individual adjacent pairs of points therein; and means coupling receivers sensitive to adjacent ranges of frequency to different dual triode tubes.

4. In binary coding apparatus a plurality of receivers each sensitive to signals of a predetermined individual frequency range; a signal selection network having four input circuits and four output circuits, said signal selection network having a pair of dual triode electron tubes; a common cathode circuit for each dual triode including cathode resistor for inducing cathode degeneration; an individual plate circuit including a load resistor for each triode; four cathode follower circuits, each having a plate, a cathode and a control grid; means responsive to changes in potential across each load resistor for energizing the control grid of an individual cathode follower circuit; four pairs of resistors and four pairs of unidirectional current elements; a circuit including in series alternate pairs of the resistors and unidirectional elements, the said unidirectional elements all being oriented so as to allow current to flow in the series circuit only in a predetermined direction; means coupling the cathode of each cathode follower circuit to an individual junction of a pair of unidirection elements in the series circuit; and means coupling each of the output circuits of the network to an individual junction of a pair of resistors in the series circuit; and means coupling receivers sensitive to adjacent ranges of frequency to different dual triode tubes.

References Cited in the file of this patent

UNITED STATES PATENTS

| | | |
|---|---|---|
| 2,378,395 | Dickson | June 19, 1945 |
| 2,478,409 | Loughlin | Aug. 9, 1949 |
| 2,616,960 | Dell | Nov. 4, 1952 |
| 2,754,494 | Brown | July 10, 1956 |